United States Patent
Ito et al.

(10) Patent No.: US 6,728,080 B2
(45) Date of Patent: *Apr. 27, 2004

(54) MAGNETIC HEAD, MAGNETIC RECORDING AND REPRODUCING APPARATUS, METHOD FOR REPRODUCING AND RECORDING MAGNETIC RECORDING INFORMATION

(75) Inventors: Kenchi Ito, Kokubunji (JP); Susumu Soeya, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 190 days.

This patent is subject to a terminal disclaimer.

(21) Appl. No.: 09/808,992

(22) Filed: Mar. 16, 2001

(65) Prior Publication Data

US 2002/0012205 A1 Jan. 31, 2002

(30) Foreign Application Priority Data

Jul. 28, 2000 (JP) ........................................ 2000-228874

(51) Int. Cl.⁷ ................................................. G11B 5/33
(52) U.S. Cl. ........................ 360/321; 360/317; 360/318
(58) Field of Search ................................. 360/321, 317, 360/318, 324.2, 59, 126; 324/252

(56) References Cited

U.S. PATENT DOCUMENTS

| 5,385,637 A | * | 1/1995 | Thayamballi | 216/22 |
| 5,930,084 A | * | 7/1999 | Dovek et al. | 360/321 |
| 5,930,087 A | * | 7/1999 | Brug et al. | 360/324.2 |
| 5,995,339 A | * | 11/1999 | Koshikawa et al. | 360/321 |
| 6,452,759 B2 | * | 9/2002 | Urai | 360/318 |
| 6,486,662 B1 | * | 11/2002 | Ruigrok et al. | 324/252 |
| 2002/0015251 A1 | * | 2/2002 | Ito et al. | 360/59 |

FOREIGN PATENT DOCUMENTS

| EP | 1176585 A2 | * | 1/2002 |
| JP | 1-224910 | * | 9/1989 |

OTHER PUBLICATIONS

"Spin Tunnel Junctions for Magnetic Head Application", by Fukami, et al pp. 313–319.

* cited by examiner

*Primary Examiner*—Tianjie Chen
(74) *Attorney, Agent, or Firm*—Antonelli, Terry, Stout & Kraus, LLP (57) ABSTRACT

A magnetic reproducing head and a magnetic recording head. The magnetic reproducing head includes a GMR or TMR magnetic sensor, and a flux guide for introducing a magnetic flux into the magnetic sensor. At least a portion of the flux guide includes a material which is capable of permitting the magnetic flux to pass therethrough at a temperature not lower than a predetermined temperature Tp, but not permitting the magnetic flux to pass therethrough at a temperature lower than Tp. Light is irradiated to only a portion of the flux guide to cause the temperature of the irradiated portion to rise up to Tp or more, thereby permitting a magnetic flux to pass only through the irradiated portion, thus narrowing the track width of magnetic reproducing head when detecting recorded information from the magnetic recording medium.

6 Claims, 9 Drawing Sheets

MAGNETIC HEAD, MAGNETIC RECORDING AND REPRODUCING APPARATUS, METHOD FOR REPRODUCING AND RECORDING MAGNETIC RECORDING INFORMATION

BACKGROUND OF THE INVENTION

The present invention relates to an information recording and reproducing apparatus which is designed such that a recording medium for retaining information by means of reversed magnetic domains of the magnetic recording film formed on the surface of substrate is employed, that an information is recorded by forming a reversed magnetic domain in the recording medium, and that the information is reproduced by detecting a leaky magnetic flux from the recording medium. The present invention relates also to a magnetic head to be mounted on the information recording and reproducing apparatus.

Figure 2A:
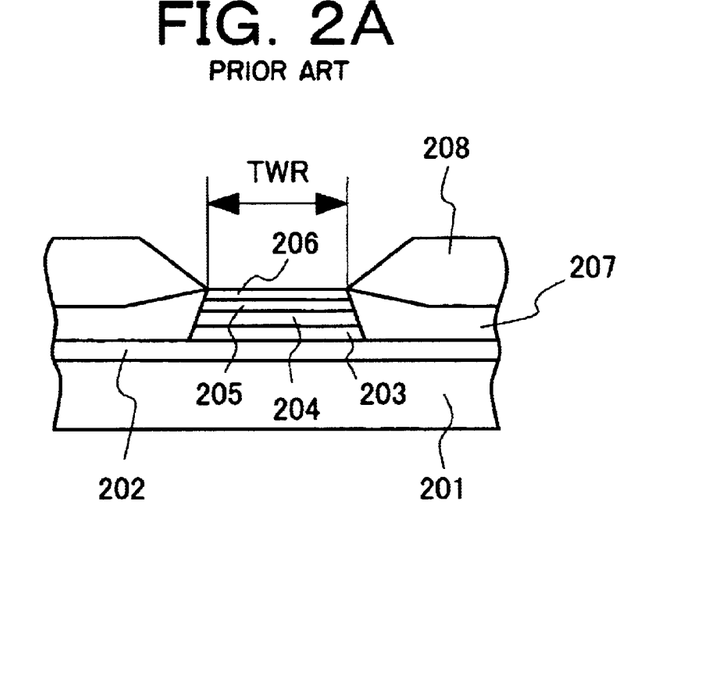
FIG. 2(a) is a cross-sectional view schematically illustrating a GMR head according to the prior art.

Due to the recent trend to further increase the recording density of magnetic recording disk drive, the track size of recording bit is now increasingly miniaturized. FIG. 2(a) illustrates a schematic view of a conventional magnetic reproducing head wherein a giant magneto-resistive effect (hereinafter abbreviated as GMR) film is employed as a magnetic sensor. According to this conventional magnetic reproducing head, the GMR film consisting of a laminate comprising a soft-magnetic free layer 203, a non-magnetic metallic intermediate layer 204, a ferromagnetic pinned layer 205 and an anti-ferromagnetic layer 206 for fixing the magnetization direction of the ferromagnetic pinned layer 205 is formed on an insulating film 202 which has been formed in advance on a lower shielding film 201. The GMR film thus formed is then patterned, after which permanent magnets 207 for stabilizing the magnetic properties of the GMR film and electrodes 208 for passing electric current to the GMR film are formed on both sides of this patterned GMR film. The width of track in this case is determined depending on the distance Twr between the electrodes 208.

Figure 2B:
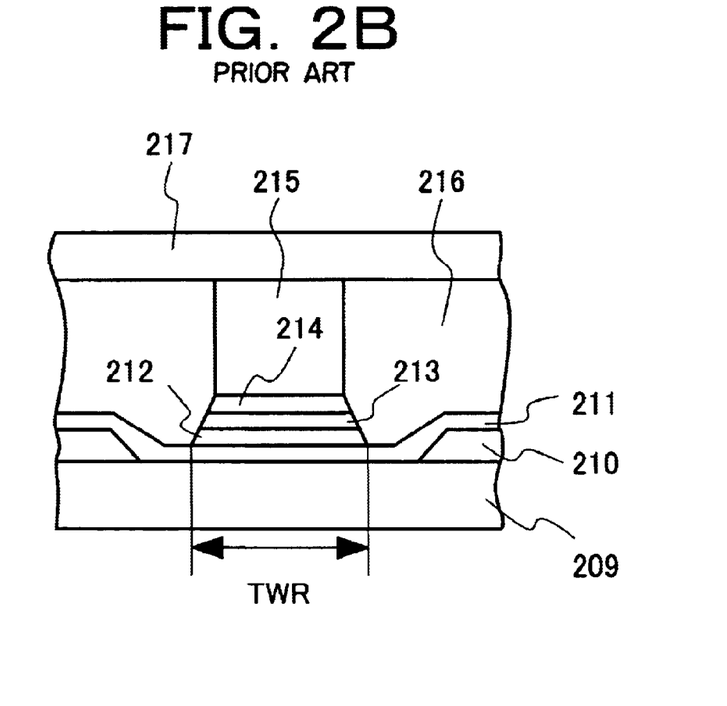
FIG. 2(B) is a cross-sectional view schematically illustrating a TMR head according to the prior art.

As described in a publication, "Proceeding of International Symposium On Future Magnetic Storage", pages 313–319, a magnetic reproducing head employing a tunneling magneto-resistive effect (hereinafter abbreviated as TMR) film is recently attracting many attentions as an ultra-high sensitive magnetic sensor of the next generation. As shown in FIG. 2(b), this magnetic reproducing head is constructed such that a permanent magnet film 210 for stabilizing the magnetic properties of the TMR film is formed on the surface of a lower electrode 209 and then, patterned. Thereafter, the TMR film consisting of a laminate comprising a soft-magnetic free layer 211, a non-magnetic insulating intermediate layer 212, a ferromagnetic pinned layer 213 and an anti-ferromagnetic layer 214 for fixing the magnetization direction of the ferromagnetic pinned layer 213 is formed on the patterned permanent magnet film 210. Then, after an upper electrode 215 is formed on the TMR film and patterned, an insulating film 216 is formed on both sides of the TMR film. After flattening the surface of the insulating film 216, additional upper electrode 217 is formed on this flattened surface. The width of track in this case is determined depending on the width Twr between the TMR film.

Figure 3:
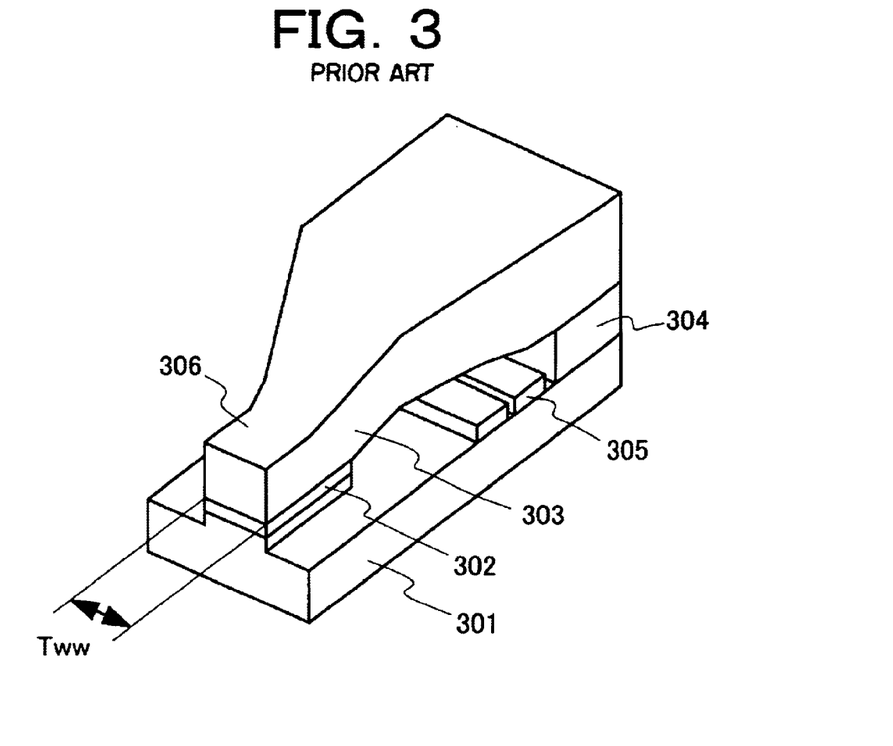
FIG. 3 is a perspective view schematically illustrating a magnetic recording head according to the prior art.

FIG. 3 illustrates a schematic view of a conventional magnetic recording head. In the case of this magnetic recording head, an upper magnetic core 303 is formed via a gap film 302 on a lower magnetic core 301, wherein the lower magnetic core 301 is magnetically connected through a back contact 304 with the upper magnetic core 303. Around this back contact 304, there is disposed a coil 305 for generating a magnetic flux in a magnetic circuit constituted by the lower magnetic core 301, the back contact 304 and the upper magnetic core 303, the magnetic flux being utilized for executing the recording by means of the recording medium. In this case, the tip end 306 of the upper magnetic core 303 is narrowed as shown in FIG. 3 for the purpose of executing the recording with a narrow track width. The width of track in this case is determined depending on the width Tww of the tip end of the upper magnetic core 303.

However, if the track size is narrowed as mentioned above, there will be raised various problems that it becomes difficult to execute the patterning of the GMR film itself, and that since the influence of manufacturing error in distance between the permanent magnetic film 207 and the electrode film 208 would become proportionally enlarged, it becomes difficult to manufacture a magnetic reproducing head exhibiting a high precision in track width. Furthermore, the GMR film is now demanded to have an increasingly high sensitivity as the track size is increasingly narrowed. However, according to the aforementioned prior art, since the permanent magnets 207 are disposed on both sides of the GMR film, the magnetization is caused to be fixed on both sides of the GMR film, thereby raising the problem that the sensitivity of the GMR film to a magnetic field is deteriorated.

On the other hand, in the case of the magnetic reproducing head utilizing the TMR film as a magnetic sensor, there is the problem, in addition to the problem that the patterning of the TMR film becomes more difficult as the track size is increasingly narrowed, that since the electric resistance of the sensor is inversely proportional to the area thereof, the electric resistance of the track becomes greater as the track size is narrowed.

Even in the case of the magnetic recording head, the width Tww of the tip end of the upper magnetic core 303 is required to be narrowed still more as the track size is increasingly narrowed. However, as the track size is increasingly narrowed, the recording area of magnetic recording medium is also miniaturized, so that the demagnetization of the magnetic recording medium due to thermal demagnetization thereof becomes a serious problem now. With a view to prevent this demagnetization, measures to enhance the coercive force of magnetic recording medium are now studied. If the coercive force of magnetic recording medium is to be enhanced, a larger recording magnetic field is required to be produced. However, if it is desired to feed a large recording magnetic field from the narrowed upper magnetic core 303, it is required to make the magnetic core somewhat larger in volume. For this purpose, it is required to manufacture an upper magnetic core having a larger film thickness. However, it is difficult to precisely control the manufacturing error of the width Tww of the tip end of upper magnetic core 303.

SUMMARY OF THE INVENTION

The present invention has been made in view of the aforementioned problems of the prior art, and therefore, an object of the present invention is to provide a magnetic reproducing head and a magnetic recording head, which are easy to manufacture and suited for executing the recording and reproducing by means of magnetic recording medium of narrow track size.

Another object of the present invention is to provide a magnetic recording method and a magnetic reproducing method, which are suited for executing the recording and reproducing by means of magnetic recording medium of narrow track size.

With a view to achieve the aforementioned objects, the present inventors have developed an optical-assisted type magnetic reproducing head and an optical-assisted type magnetic recording head.

Namely, this optical-assisted type magnetic reproducing head is constituted by a GMR or TMR magnetic sensor, and a flux guide for introducing a magnetic flux into the magnetic sensor, wherein at least a portion of the flux guide is constituted by a material which is capable of permitting the magnetic flux to pass therethrough at a temperature of not lower than a predetermined temperature Tp, but not permitting the magnetic flux to pass therethrough at a temperature of lower than Tp. Furthermore, this optical-assisted type magnetic reproducing head is featured in that light is irradiated to only a portion of the flux guide to cause the temperature of the irradiated portion to rise up to Tp or more, thereby permitting a magnetic flux being fed from the magnetic recording medium to pass only through the irradiated portion, thus substantially narrowing the track width of the magnetic reproducing head on the occasion of detecting a magnetic recording information from the magnetic recording medium.

On the other hand, the optical-assisted type magnetic recording head is provided with a magnetic core, and a flux guide which is disposed to face the magnetic recording medium of the magnetic core, wherein, according to the same principle as that of the magnetic reproducing head, the temperature of the irradiated portion of the flux guide is allowed to rise up to Tp or more, thereby permitting a magnetic flux being fed from the magnetic core to pass only through the irradiated portion to the magnetic recording medium, thus substantially narrowing the track width of the magnetic recording head on the occasion of recording a magnetically reversed information in the magnetic recording medium.

It is now possible in this manner to construct a magnetic recording head and a magnetic reproducing head, which are capable of recording and reproducing information to a magnetic recording medium of small track size.

Namely, the magnetic head according to one embodiment of the present invention is featured in that it comprises a magnetic sensor for detecting a magnetic field, and a flux guide for introducing a magnetic flux into the magnetic sensor, wherein at least a portion of said flux guide is constructed to permit the magnetic flux to pass therethrough at a temperature of not lower than a predetermined temperature Tp, but not to permit the magnetic flux to pass therethrough at a temperature of lower than Tp.

Preferably, the magnetic sensor is formed of a laminate structure comprising a soft-magnetic free layer enabling the magnetization thereof to be rotated depending on an external magnetic field, a non-magnetic intermediate layer, and a ferromagnetic pinned layer where the magnetization thereof is fixed against an external magnetic field. More specifically, the magnetic sensor is formed of a giant magneto-resistive effect film (spin valve film) or a tunneling magneto-resistive effect film. These magnetic sensors are featured in that the magnetization thereof is enabled rotate depending on an external magnetic field being detected, thereby causing a relative angle thereof to the magnetization direction of the ferromagnetic pinned layer to be changed, thus producing a magneto-resistive effect.

The magnetic head according to another embodiment of the present invention is featured in that it comprises a lower magnetic core formed on a substrate, an upper magnetic core having a distal end facing the lower magnetic core with a magnetic gap film being interposed therebetween and a proximal end magnetically coupled with the lower magnetic core through a contact portion, and a coil for generating a magnetic flux in a magnetic circuit constituted by said lower magnetic core, said contact portion and said upper magnetic core, wherein a flux guide is provided at the distal end of said upper magnetic core, said flux guide being constructed to permit a magnetic flux to pass therethrough at a temperature of not lower than a predetermined temperature Tp, but not to permit the magnetic flux to pass therethrough at a temperature of lower than Tp.

The contact portion for enabling the proximal end of the upper magnetic core to be magnetically coupled with the lower magnetic core may be constructed such that the lower magnetic core is directly coupled with the upper magnetic core, or that the lower magnetic core is indirectly coupled with the upper magnetic core via a separate back contact member made of a magnetic body.

The flux guide which is capable of permitting a magnetic flux to pass therethrough at a temperature of not lower than a predetermined temperature Tp, but not permitting the magnetic flux to pass therethrough at a temperature of lower than Tp may be constituted by a material exhibiting ferromagnetic property at a temperature of not lower than the Tp and also exhibiting anti-ferromagnetic property at a temperature of lower than the Tp.

Figure 4:
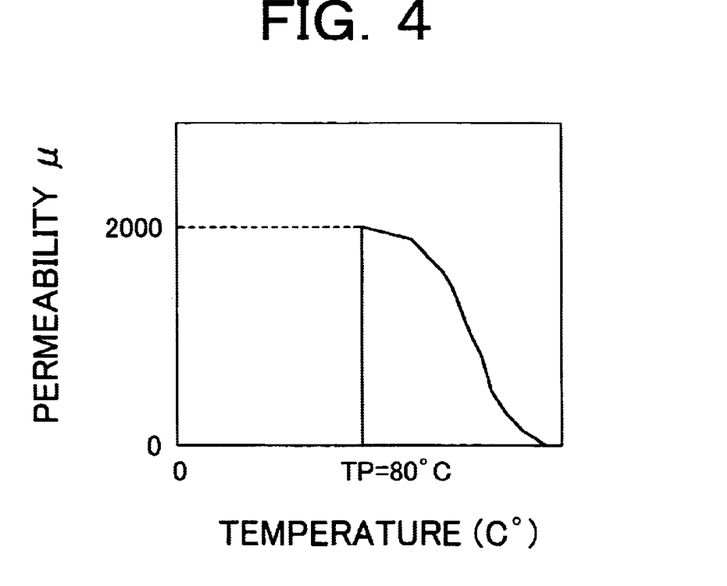
FIG. 4 is a graph illustrating the temperature characteristics of the permeability of MnRh.

As for the materials useful for the flux guide of the magnetic head according to the present invention, it is possible to employ MnRh for instance. This MnRh is capable of exhibiting a phase transition from an anti-ferromagnetic phase to a ferromagnetic phase at a temperature of 80 degrees centigrade (Tp=80° C.). FIG. 4 shows the temperature characteristics of the permeability of MnRh. The aforementioned portion of flux guide may not necessarily be constituted by a single layer, but may be formed of a laminate structure. Examples of 2-ply film in this case include 2-ply films consisting of NiFe and any one of materials selected from NiO, MnRh and FeMn (NiO/NiFe, MnRh/NiFe or FeMn/NiFe). As for the examples of 3-ply film, it is possible to employ NiFe/NiFeNb/CrMnPt, NiFe/NiFeNb/MnPt, etc. These 3-ply films are featured in that the permeability thereof is sharply increased at Tp=100° C. Although not it is not specifically mentioned herein, it is of course possible to employ a 4- or more-ply film.

Preferably, the magnetic head further comprises a shading shield slit formed over the flux guide, and means for irradiating light to the flux guide through the shading shield slit.

When light is irradiated to the flux guide through the slit, it is possible to provide the flux guide with a characteristic which enables a magnetic flux to pass only through a portion thereof having a slit-like configuration where the light has been irradiated. Therefore, it is possible to form a narrowed flux pass in the magnetic head without necessitating to work the distal end portion of the flux guide or the upper magnetic core so as to make it narrower. By the way, the shading shield can be formed from a metallic film.

The flux guide may comprise an anti-ferromagnetic film which can be made from a compound selected from NiO, MnRh and FeMn.

Further, the flux guide may be constituted by a laminate film consisting of NiFe and any one of materials selected from NiO, MnRh and FeMn.

The magnetic recording and reproducing apparatus according to another embodiment of the present invention is featured in that it comprises a magnetic recording medium for retaining information by means of reversed magnetic domains, a medium-driving means for driving the magnetic recording medium, a magnetic head for executing recording and reproducing to the magnetic recording medium, and a magnetic head-driving means for driving the magnetic head relative to the magnetic recording medium, wherein said magnetic head is constituted by the aforementioned reproducing magnetic head and recording magnetic head.

The method for reproducing magnetic recording information according to another embodiment of the present invention, wherein the information is reproduced by detecting a leaky magnetic flux generated from the recording medium after the leaky magnetic flux is introduced via a flux guide into a magnetic sensor, is featured in that at least a portion of the flux guide is constituted by a material which is capable of permitting the magnetic flux to pass therethrough at a temperature of not lower than a predetermined temperature Tp, but not permitting the magnetic flux to pass therethrough at a temperature of lower than Tp; and in that light is irradiated to only a portion of the flux guide to cause the temperature of the irradiated portion to rise up to Tp or more, thereby establishing a flux pass in flux guide, the flux pass being narrower in width than that of the flux guide, thereby permitting a magnetic flux being fed from the magnetic recording medium to pass into the magnetic sensor only through the flux pass that has been established by the irradiated light.

The magnetic recording method according to another embodiment of the present invention, wherein a magnetic flux generated from a magnetic pole is applied to a magnetic recording medium to thereby execute a magnetic recording of the magnetic recording medium, is featured in that a flux guide is constituted by a material which is capable of permitting the magnetic flux to pass therethrough at a temperature of not lower than a predetermined temperature Tp, but not permitting the magnetic flux to pass therethrough at a temperature of lower than Tp; in that the flux guide is connected with a distal end of the magnetic pole; and in that light is irradiated to only a portion of the flux guide to cause the temperature of the irradiated portion to rise up to Tp or more, thereby establishing a flux pass in flux guide, the flux pass being narrower in width than that of the flux guide, thereby permitting a magnetic flux to be applied to the magnetic recording medium only through the flux pass that has been established by the irradiated light.

DETAILED DESCRIPTION OF THE INVENTION

Next, various embodiments of the present invention will be explained with reference to drawings.

Figure 1A:
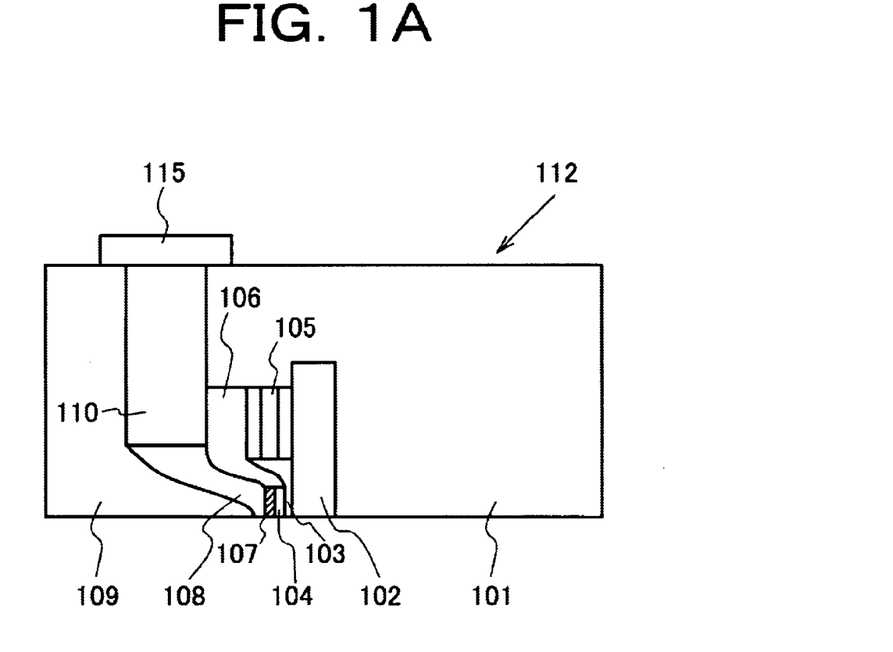
FIG. 1(a) is a cross-sectional view schematically illustrating one embodiment of the optical-assisted magnetic reproducing head according to one example of the present invention.
Figure 1B:
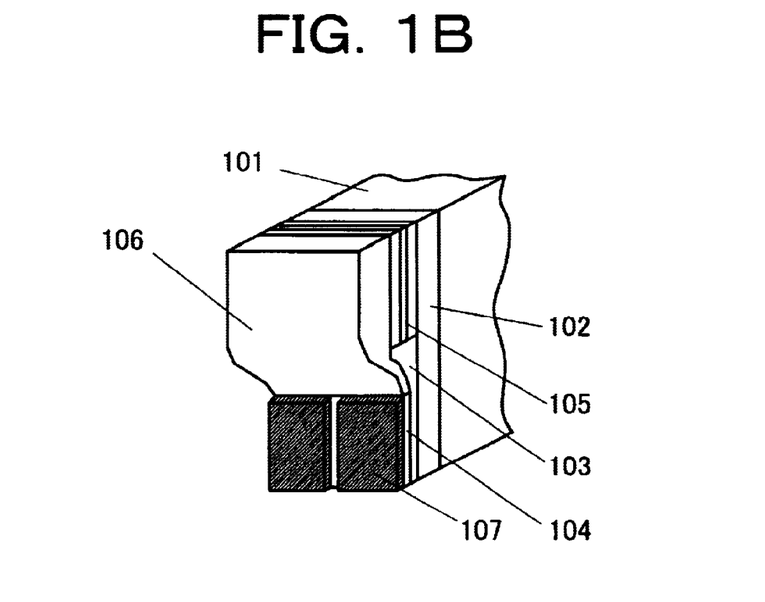
FIG. 1(b) is a perspective view schematically illustrating one embodiment of the optical-assisted magnetic reproducing head according to one example of the present invention.

FIG. 1(a) shows a cross-sectional view schematically illustrating an optical-assisted magnetic reproducing head representing one example of an optical induction type thin film magnetic head according to one example of the present invention. FIG. 1(b) is a perspective view of part of the optical-assisted magnetic reproducing head shown in FIG. 1(a). In FIG. 1(b), for the convenience of explaining the structure of the head, an upper shield 109, an optical waveguide 110 and an insulating film 108 are omitted.

As shown in these FIGS., a lower shield 102 is formed on a substrate 101 of a slider 112, and a first flux guide 104 and a magnetic sensor 105 having a TMR film are formed via an insulating layer 103 made, for example, of aluminum oxide on the lower shield 102. This first flux guide 104 may be constituted by a 25 nm thick NiFe/MnRu film or by a 30 nm thick NiFe/FeMn film. This first flux guide 104 is connected with a second flux guide 106 which is made of an ordinary soft-magnetic film (for example, a 30 nm thick NiFe film). One end of the second flux guide 106 is connected with the magnetic sensor 105, thereby permitting a magnetic flux to be introduced from the recording medium into the magnetic sensor 105.

A metallic film slit 107 made of Cr, Ta, etc. is formed on the first flux guide 104. On this metallic film slit 107, there are successively formed a transparent insulating film 108 made for example of SiO2, Al2O3, etc. and an upper shield 109. This insulating film 108 is formed larger in thickness at a portion other than the region thereof which is disposed close to the sliding surface, thereby permitting light to effectively pass therethrough. The rear end of the insulating film 108 is connected with an optical waveguide 110 made of a material exhibiting a high light transmittance such as SiO2 and having a size of 2 μm×2 μm for instance. Light is designed to be transmitted from a vertical emission laser 115 to the optical waveguide 110. Where the size of the optical waveguide 110 is set to 2 μm×2 μm, the size of the insulating film 108 is required to be set to such that the portion thereof which contacts with the optical waveguide has a size of 2 µm×2 µm, and the portion thereof which contacts with the metallic film slit 107 has a width (in the direction of the track) of 2 µm and a depth of 0.5 µm or more.

The magnetic sensor 105 may be constituted by the TMR or GMR film. As for the TMR film, it may be constituted by a structure of Ta/NiFe/CoFe/AlO/CoFe/NiFe/MnIr/Ta, which is 0.5 µm×0.5 µm in size, 100 Ω in resistance, and about 20% in MR ratio as measured at a place where the bias voltage is zero. As for the GMR film, it may be constituted by a structure of Ta/NiFe/CoFe/Cu/CoFe/NiFe/MnIr/Ta, which is 0.5 µm in width, 0.3 µm in depth, 20 Ω in resistance, and about 10% in MR ratio.

The light emitted from the vertical emission laser 115 is combined at the optical waveguide 110 and passed through the transmissive insulating film 108 to the metallic film slit 107, and the light passed through this slit 107 is then irradiated in a form of band onto the first flux guide 104 to heat up the irradiated portion thereof. If the irradiation of light is performed under the conditions where the width of metallic film slit 107 is set to 170 nm, the laser power to be emitted from the vertical emission laser 115 is set to 3 mW, and NiFe/MnRu is employed as the first flux guide, it is possible to realize a track width of 150 nm, thus obtaining a magnetic reproducing head which is capable of realizing a recording density of 100 Gb/in2. The surface of the medium may be heated up to some degree due to the light leaked from the sliding surface of the magnetic reproducing head. However, it would not give any substantial influence to the recording magnetization of the medium.

Figure 5:
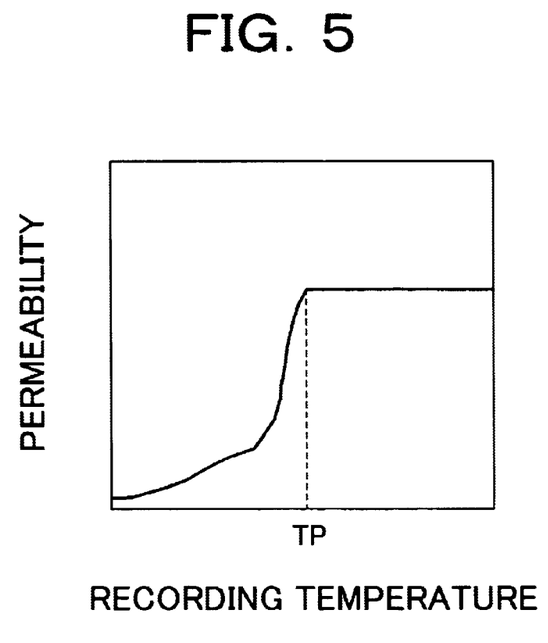
FIG. 5 is a graph illustrating the principle of operation of the optical-assisted magnetic reproducing head shown in FIG. 1.
Figure 6:
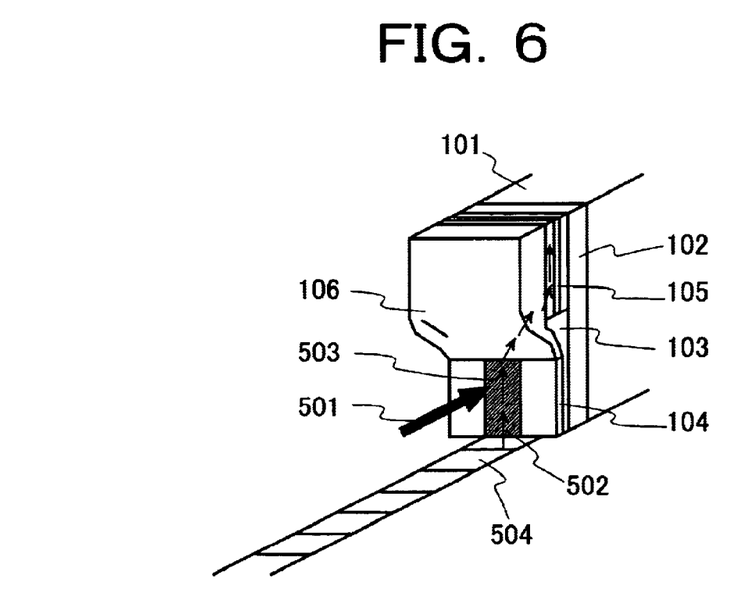
FIG. 6 is a perspective view illustrating the principle of operation of the optical-assisted magnetic reproducing head shown in FIG. 1.

FIG. 5 is a graph illustrating the principle of operation of the optical-assisted magnetic reproducing head shown in FIG. 1, wherein the relationship between the permeability of the material of first flux guide and the temperature thereof is illustrated. As seen from FIG. 5, the permeability of the material of first flux guide employed in the present invention is almost zero at room temperature (30° C.). However, as the temperature of the material is raised, the permeability thereof is also increased, the value of the permeability being subsequently saturated to a constant value after a predetermined temperature Tp. When light 501 is irradiated through the metallic film slit 107 onto the first flux guide made of this material as shown in FIG. 1, the temperature of the irradiated portion 502 is allowed to rise up to Tp or more as shown in FIG. 6 to thereby enhance the permeability of that irradiated portion, thus allowing the magnetic flux 503 fed from the medium to pass therethrough so as to be guided toward the magnetic sensor 105. Since the depth of penetration of light in the case of ordinary metal is about 10 nm, it would be sufficient even if the thickness of the metallic film slit 107 is set to 20 nm, and the patterning can be easily achieved even if the width of the slit is 100 nm or less. Accordingly, a flux pass having a width of not more than 100 nm can be easily formed, thereby making it suitable for the miniaturization of the track size. Moreover, since the area of the TMR film can be sufficiently enlarged, it becomes possible to inhibit an increase in resistance of the magnetic sensor employing the TMR film.

Figure 7A:
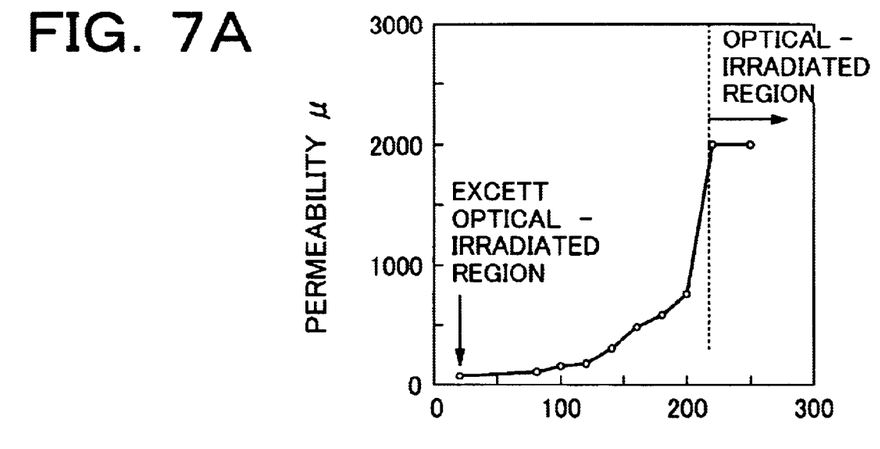
FIGS. 7(a), 7(b) and 7(c) illustrate examples of the temperature dependency of the materials of flux guide and of the permeability thereof.
Figure 7B:
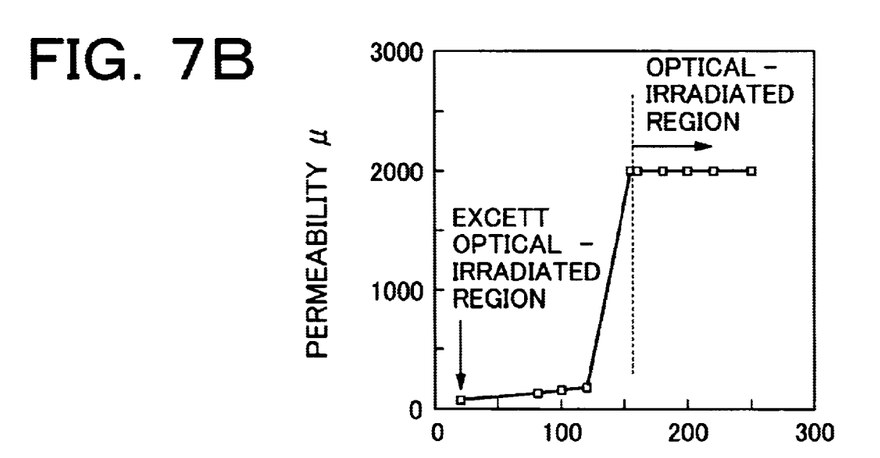
Figure 7C:
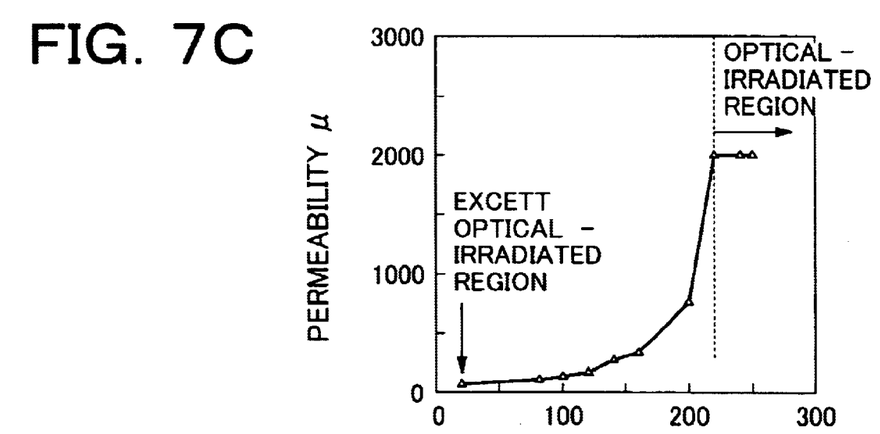

FIGS. 7(a), 7(b) and 7(c) illustrate the temperature dependency of the materials of flux guide and of the permeability thereof, wherein FIG. 7(a) shows the characteristics of a flux guide having a laminated structure consisting of an anti-ferromagnetic film made of MnRu and having a thickness of 15 nm, and an NiFe layer deposited on the anti-ferromagnetic film for the purpose of improving the soft-magnetic characteristics of the flux guide and having thickness of 10 nm. As seen from FIG. 7(a), although the permeability of the material is as very small as about 70 at room temperature, but the permeability thereof is sharply increased as the temperature is further raised. At the blocking temperature of the MnRu (Tp=220° C.) or more, the permeability thereof is increased up to 2000 or more.

FIG. 7(b) shows the characteristics of a flux guide having a laminated structure consisting of an anti-ferromagnetic film made of MnFe and having a thickness of 20 nm, and an NiFe layer deposited on the anti-ferromagnetic film for the purpose of improving the soft-magnetic characteristics of the flux guide and having thickness of 10 nm. As seen from FIG. 7(b), although the permeability of the material is as very small as about 70 at room temperature, but the permeability thereof is sharply increased as the temperature is further raised. At the blocking temperature of the MnFe (Tp=155° C.) or more, the permeability thereof is increased up to 2000 or more.

FIG. 7(c) shows the characteristics of a flux guide having a laminated structure consisting of an anti-ferromagnetic film made of NiO and having a thickness of 50 nm, and an NiFe layer deposited on the anti-ferromagnetic film for the purpose of improving the soft-magnetic characteristics of the flux guide and having thickness of 10 nm. In this case also, although the permeability of the material is as very small as about 100 at room temperature, but the permeability thereof is sharply increased as the temperature is further raised. At the blocking temperature of the NiO (Tp=200° C.) or more, the permeability thereof is increased up to 2000 or more.

Figure 8A:
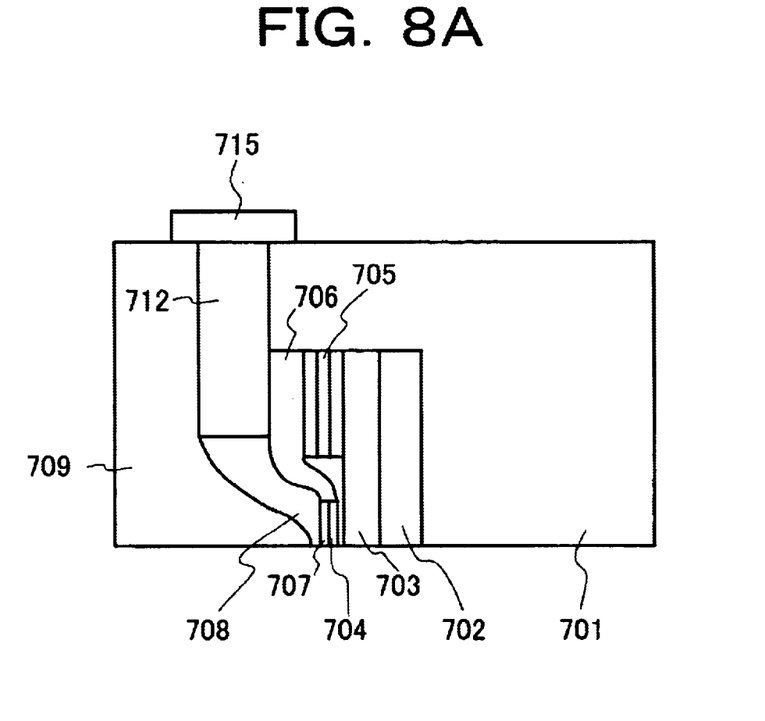
FIG. 8(a) is a cross-sectional view schematically illustrating one embodiment of the optical-assisted magnetic reproducing head according to another example of the present invention.
Figure 8B:
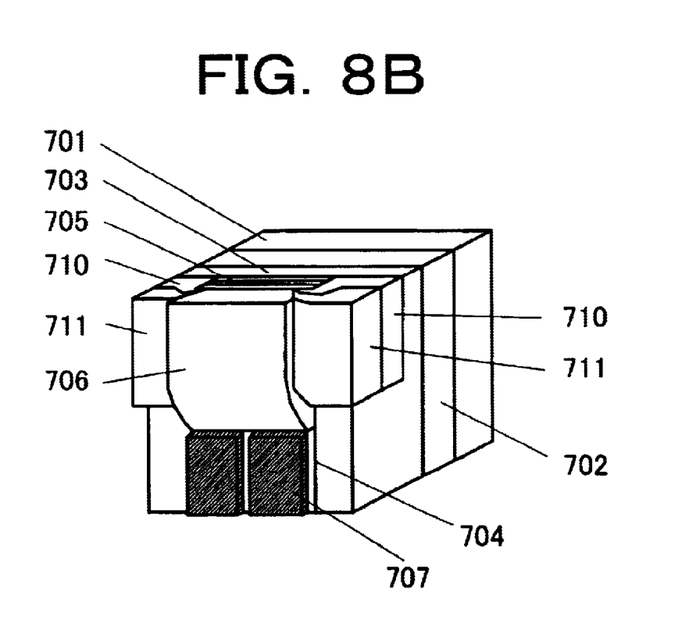
FIG. 8(b) is a perspective view schematically illustrating one embodiment of the optical-assisted magnetic reproducing head according to another example of the present invention.

FIGS. 8(a) and 8(b) schematically show an optical-assisted magnetic reproducing head according to a second embodiment of the present invention. More specifically, FIG. 8(a) is a cross-sectional view schematically illustrating the optical-assisted magnetic reproducing head according to this embodiment. FIG. 8(b) is a perspective view of part of the optical-assisted magnetic reproducing head shown in FIG. 8(a). In FIG. 8(b), for the convenience of explaining the structure of the head, an upper shield 709, an optical waveguide 712 and an insulating film 708 are omitted.

As shown in these FIGS., a lower shield 702 is formed on a substrate 701, and a first flux guide 704 constituted by a material as described above and a magnetic sensor 705 having a GMR film are formed via an insulating layer 703 made, for example, of aluminum oxide on the lower shield 702. This flux guide 704 is connected with a second flux guide 706 which is made of an ordinary soft-magnetic film (for example, an NiFe film). One end of the second flux guide 706 is connected with the magnetic sensor 705, thereby permitting a magnetic flux to be introduced from the recording medium into the magnetic sensor 705.

A metallic film slit 707 is formed on the first flux guide 704. On this metallic film slit 707, there are successively formed a transparent insulating film 708 and an upper shield 709. Permanent magnet films 710 and electrodes 711 are disposed on both sides of the GMR film. This insulating film 708 is formed larger in thickness at a portion other than the region thereof which is disposed close to the sliding surface as shown in FIG. 8(a), thereby permitting light to effectively pass therethrough. The rear end of the insulating film 708 is connected with an optical waveguide 712 made of a material exhibiting a high light transmittance.

The light emitted from the vertical emission laser 715 is combined at the optical waveguide 710 and passed through the transmissive insulating film 708 to the metallic film slit 707, and the light passed through this slit 707 is then irradiated in a form of band onto the first flux guide 704 to heat up the irradiated portion thereof. The band-like portion of the first flux guide 704 which has been heated up to a temperature of Tp or more due to the irradiation of light is enhanced of its permeability, thereby allowing a leaky magnetic flux generated from the magnetic recording medium to pass through this narrow band-like portion where the permeability has been enhanced so as to be introduced into the second flux guide 706, from which the leaky magnetic flux is introduced into the magnetic sensor 705 having the GMR film.

Figure 9:
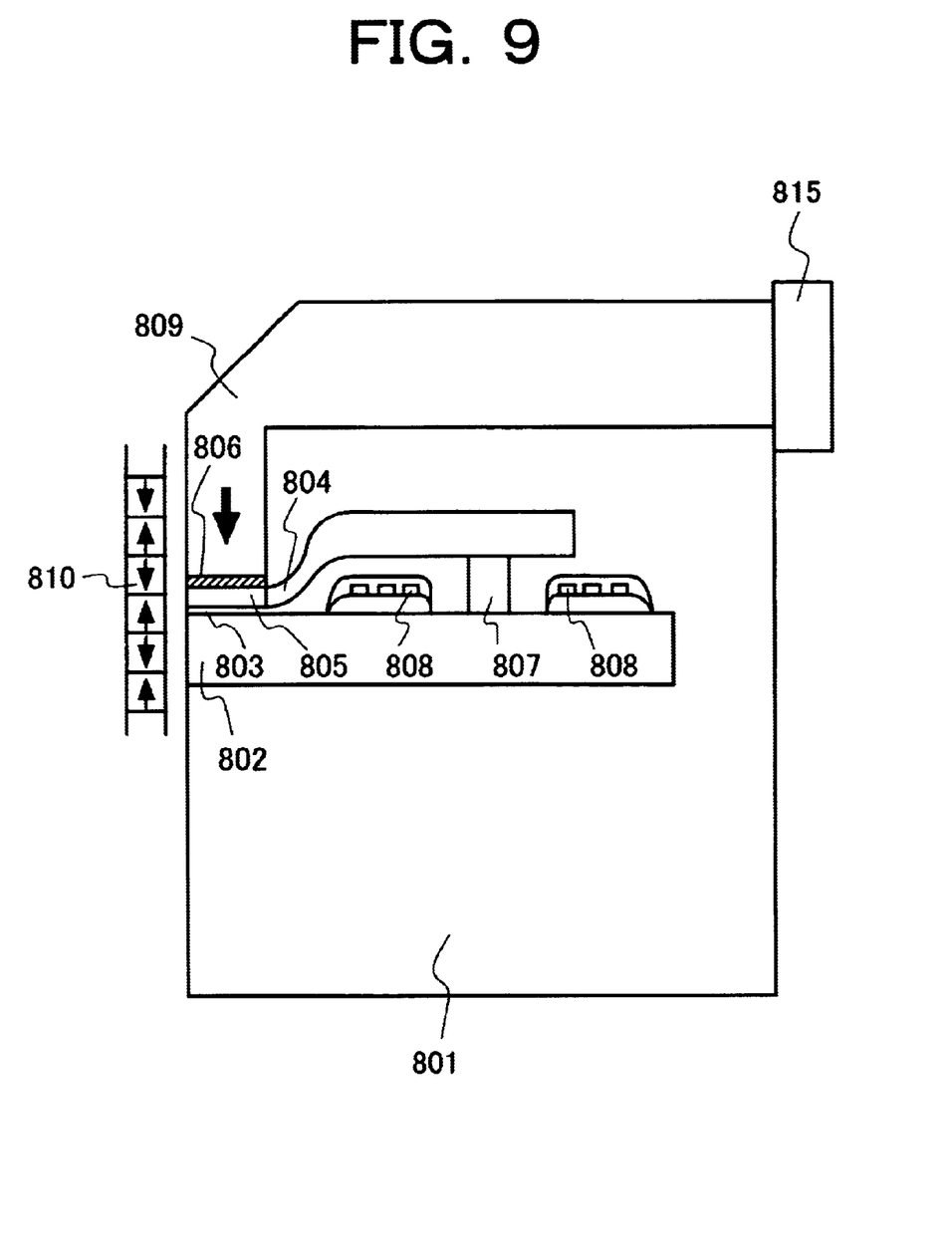
FIG. 9 is a cross-sectional view schematically illustrating one example of an in-plane magnetic recording head of the present invention.

FIG. 9 shows a cross-sectional view schematically illustrating a third embodiment of the present invention wherein the first flux guide employed in the first embodiment is applied to the magnetic recording head for in-plane magnetic recording. A lower magnetic pole 802 is formed on a substrate 801, and an upper magnetic pole 804 is formed via a magnetic gap film 803 on the lower magnetic pole 802. A flux guide 805 made of the same material as employed for the first flux guide described in the first embodiment as well as a metallic film slit 806 are disposed at the distal end of the upper magnetic pole 804. These upper and lower magnetic poles 804 and 802 are connected with each other through a back contact portion 807 which is surrounded by a coil 808 provided for generating a magnetic flux in a magnetic circuit which is constituted by the lower magnetic pole 802, the back contact portion 807 and the upper magnetic pole 804. The light emitted from the vertical emission laser 815 is transmitted through an optical waveguide 809 to the metallic film slit 806 from the direction which is parallel with the sliding surface, and the light passed through this slit 806 is then irradiated onto the flux guide 805.

As a result, only the narrow band-like portion of the flux guide 805 where the light is irradiated through the metallic film slit 806 is caused to rise in temperature up to Tp or more to thereby enhance the permeability of that irradiated portion. Therefore, the magnetic flux generated from the upper magnetic pole 804 is allowed to pass through this irradiated portion of the flux guide 805 so as to be guided toward an in-plane magnetic recording medium 810. Since the depth of penetration of light in the case of ordinary metal is about 10 nm, it would be sufficient even if the thickness of the metallic film slit 107 is set to 20 nm, and the patterning can be easily achieved even if the width of the slit is 100 nm or less. Therefore, according to the magnetic recording head of this embodiment, a flux pass having a width of not more than 100 nm can be easily formed, thereby making it suitable for the miniaturization of the recording track size of in-plane magnetic recording medium.

Figure 10:
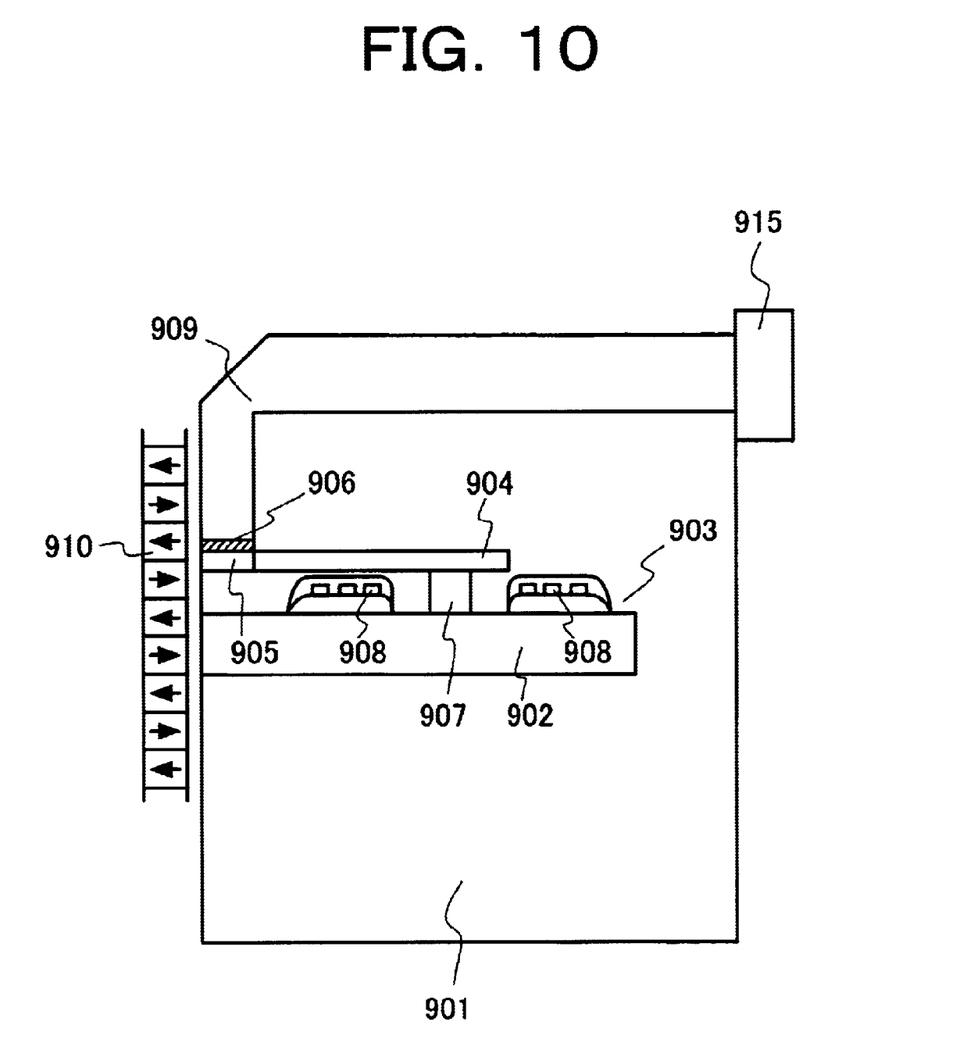
FIG. 10 is a cross-sectional view schematically illustrating one example of a perpendicular magnetic recording head of the present invention.

FIG. 10 shows a cross-sectional view schematically illustrating a fourth embodiment of the present invention wherein the first flux guide employed in the first embodiment is applied to the magnetic recording head for perpendicular magnetic recording. A lower magnetic pole 902 is formed on a substrate 901, and an upper magnetic pole 904 is formed via a magnetic gap film 903 on the lower magnetic pole 902. In this case, the magnetic gap film 903 is deposited relatively thick so as to prevent a leakage of magnetic flux between the magnetic poles. A flux guide 905 made of the same material as employed for the first flux guide described in the first embodiment as well as a metallic film slit 906 are disposed at the distal end of the upper magnetic pole 904. These upper and lower magnetic poles 904 and 902 are connected with each other through a back contact portion 907 which is surrounded by a coil 908 provided for generating a magnetic flux in a magnetic circuit which is constituted by the lower magnetic pole 902, the back contact portion 907 and the upper magnetic pole 904. The light emitted from the vertical emission laser 915 is transmitted through an optical waveguide 909 to the metallic film slit 906 from the direction which is parallel with the sliding surface, and the light passed through this slit 906 is then irradiated onto the flux guide 905.

As a result, only the narrow band-like portion of the flux guide 905 where the light is irradiated through the metallic film slit 906 is caused to rise in temperature up to Tp or more to thereby enhance the permeability of that irradiated portion. Therefore, the magnetic flux generated from the upper magnetic pole 904 is allowed to pass through this irradiated portion of the flux guide 905 so as to be guided toward a perpendicular magnetic recording medium 910. Since the depth of penetration of light in the case of ordinary metal is about 10 nm, it would be sufficient even if the thickness of the metallic film slit 107 is set to 20 nm, and the patterning can be easily achieved even if the width of the slit is 100 nm or less. Therefore, according to the magnetic recording head of this embodiment, a flux pass having a width of not more than 100 nm can be easily formed, thereby making it suitable for the miniaturization of the recording track size of perpendicular magnetic recording medium.

Since the magnetic recording head of perpendicular magnetic recording medium is formed of a single magnetic pole head, the upper magnetic pole (main magnetic pole) 904 is aligned in straight with the flux guide 905 as shown in FIG. 10. Since it is required, in the case of the single magnetic pole head, to provide some degree of gap between the upper magnetic pole 904 and the lower magnetic pole (subsidiary magnetic pole) 902, the resultant structure becomes as shown in FIG. 10. Whereas in the case of the magnetic recording head of in-plane magnetic recording medium however, it is required to minimize the gap 803 between the upper magnetic pole (main magnetic pole) 804 and the lower magnetic pole (subsidiary magnetic pole) 802, the resultant structure becomes such that the upper magnetic pole 804 is bent relative to the flux guide 805 as shown in FIG. 9.

Figure 11:
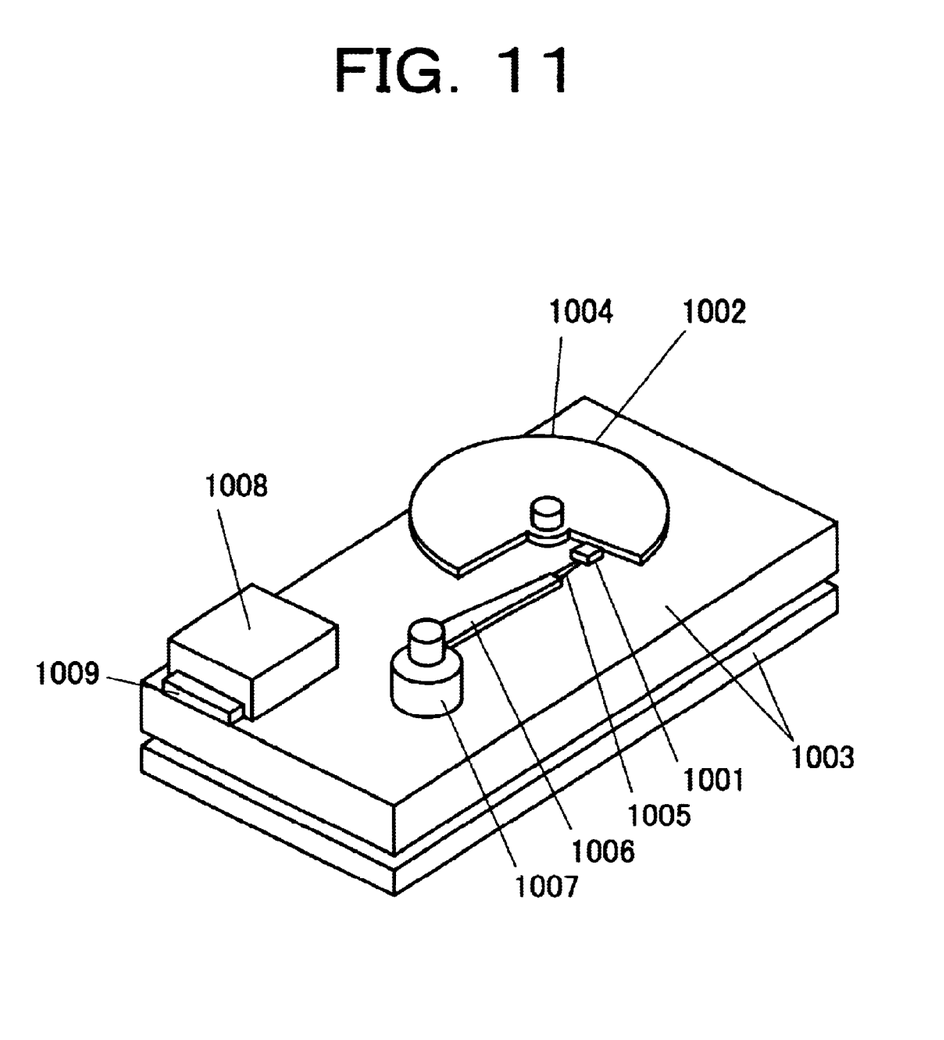
FIG. 11 is a perspective view schematically illustrating a magnetic recording and reproducing apparatus according to the present invention.

FIG. 11 shows the structure of one example of the magnetic recording and reproducing apparatus according to the present invention. This magnetic recording and reproducing apparatus is provided with a magnetic disk 1002 which can be driven to rotate, with a slider 1001 mounting thereon the aforementioned magnetic reproducing head of the present invention and a conventional magnetic recording head, and with a driving means 1007 for driving the slider 1001. The magnetic disk 1002 is mounted on the axis 1004 connected with a spindle motor (not shown) which is fixed to a base 1003. The magnetic disk 1002 is adapted to be rotated by means of a spindle and hence permitted to move relative to the slider 1001. The slider 1001 is fixed to a suspension 1005 which is mounted on an arm 1006. The arm 1006 is designed to be rotated about the axis thereof by means of a driving mechanism 1007, thereby enabling the slider 1001 to move in the radial direction of the magnetic disk 1002, thus executing the access of information track as well as the tracking operation relative to a predetermined information track. A connector 1009 is connected with an interface 1008 attached to the base 1003, thereby making it possible, through a cable connected with the connector 1009, to execute the supply of electric source for actuating the magnetic recording and reproducing apparatus, to instruct the initiation of recording or reproducing to the apparatus, to input a recording information, or to output a reproducing information.

In this embodiment of magnetic recording and reproducing apparatus, an optical-assisted magnetic reproducing head according to the present invention and a conventional magnetic recording head are employed as magnetic heads to be mounted on the slider 1001. However, it is also possible to employ an optical-assisted magnetic recording head according to the present invention and a conventional magnetic reproducing head for mounting them on the slider so as to constitute a magnetic recording and reproducing apparatus. Alternatively, an optical-assisted magnetic reproducing head according to the present invention and an optical-assisted magnetic recording head according to the present invention may be combined with each other for mounting them on the slider so as to constitute a magnetic recording and reproducing apparatus.

According to the present invention, it is now possible to easily obtain a magnetic head which is suited for executing the recording and reproducing by means of magnetic recording medium of narrow track size, thereby making it possible to improve the recording density of the magnetic recording and reproducing apparatus.

What is claimed is:

1. A magnetic head comprising:

a magnetic sensor for detecting a magnetic field; and a flux guide for introducing a magnetic flux into the magnetic sensor, wherein at least a portion of said flux guide is constructed to permit the magnetic flux to pass therethrough at a temperature of not lower than a predetermined temperature Tp, but not to permit the magnetic flux to pass therethrough at a temperature of lower than Tp, and wherein said flux guide is constituted by a material which exhibits ferromagnetic property at a temperature of not lower than the Tp and exhibits anti-ferromagnetic property at a temperature lower than Tp, wherein a flux transmitting region with a width narrower than the width of said flux guide is established in a part of said flux guide so that the magnetic flux can be exchanged with a magnetic recording medium via said flux transmitting region.

2. The magnetic head according to claim 1, wherein said magnetic sensor is formed of a laminate structure comprising a soft-magnetic free layer enabling the magnetization thereof to be rotated depending on an external magnetic field, a non-magnetic intermediate layer, and a ferromagnetic pinned layer where the magnetization thereof is fixed against an external magnetic field.

3. The magnetic head according to claim 1, wherein the flux guide is formed of a material selected from NiO, MnRh and FeMn.

4. The magnetic head according to claim 1, wherein the flux guide is constituted by a laminate film consisting of NiFe and any one of materials selected from NiO, MnRh and FeMn.

5. A magnetic head comprising:

a lower magnetic core formed on a substrate;

an upper magnetic core having a distal end facing the lower magnetic core with a magnetic gap film being interposed therebetween and a proximal end magnetically coupled with the lower magnetic core through a contact portion; and a coil for generating a magnetic flux in a magnetic circuit constituted by said lower magnetic core, said contact portion and said upper magnetic core, wherein a flux guide is provided at the distal end of said upper magnetic core, said flux guide being constructed to permit a magnetic flux to pass therethrough at a temperature of not lower than a predetermined temperature Tp, but not to permit the magnetic flux to pass therethrough at a temperature lower than Tp, and wherein said flux guide is constituted by a material which exhibits ferromagnetic property at a temperature of not lower than the Tp and exhibits anti-ferromagnetic property at a temperature lower than Tp, wherein a flux transmitting region with a width narrower than the width of said flux guide is established in a part of said flux guide so that the magnetic flux can be exchanged with a magnetic recording medium via said flux transmitting region.

6. The magnetic head comprising:

a magnetic sensor for detecting a magnetic field; and a flux guide for introducing a magnetic flux into the magnetic sensor, wherein at least a portion of said flux guide is constructed to permit the magnetic flux to pass therethrough at a temperature of not lower than a predetermined temperature Tp, but not to permit the magnetic flux to pass therethrough at a temperature lower than Tp;

a shading shield slit formed over the flux guide; and means for irradiating light to the flux guide through the shading shield slit.

* * * * *